United States Patent [19]
Scott

[11] Patent Number: 4,901,763
[45] Date of Patent: Feb. 20, 1990

[54] FLUID VALVE APPARATUS

[76] Inventor: Blayney J. Scott, 306 Dallas Road, Victoria, British Columbia, Canada, V8V 1A7

[21] Appl. No.: 283,830

[22] Filed: Dec. 13, 1988

[51] Int. Cl.⁴ .................. F16K 25/00; F16K 11/085
[52] U.S. Cl. ......................... 137/625.47; 251/175; 251/192; 251/312
[58] Field of Search .................. 251/175, 192, 312; 137/625.47

[56] References Cited

U.S. PATENT DOCUMENTS

| | | | |
|---|---|---|---|
| 2,945,666 | 7/1960 | Freeman et al. | 251/175 X |
| 3,210,042 | 10/1965 | Freeman | 251/175 |
| 4,523,604 | 6/1985 | Hutto | 251/175 X |
| 4,562,994 | 1/1986 | MacDonald | 251/175 |
| 4,609,177 | 9/1986 | Turner et al. | 251/175 |

Primary Examiner—Arnold Rosenthal
Attorney, Agent, or Firm—Bull, Housser & Tupper

[57] ABSTRACT

A fluid valve apparatus has a spool mounted for movement within a spool cavity of a body, the body having inlet and outlet ports therein. The spool has a spool closure portion which is adapted for sealing against the outlet port when positioned thereagainst. The spool closure portion is responsive to fluid pressure acting on the spool which cooperates with the spool so as to displace the closure portion against the outlet portion to improve sealing therewith. The apparatus is particularly adapted for manufacturing by plastic injection, which provides a low cost, lightweight, corrosion resistant, easily adaptable valve assembly particularly for use in controlling liquid flows in medium bore pipes as used in forest fire fighting.

20 Claims, 3 Drawing Sheets

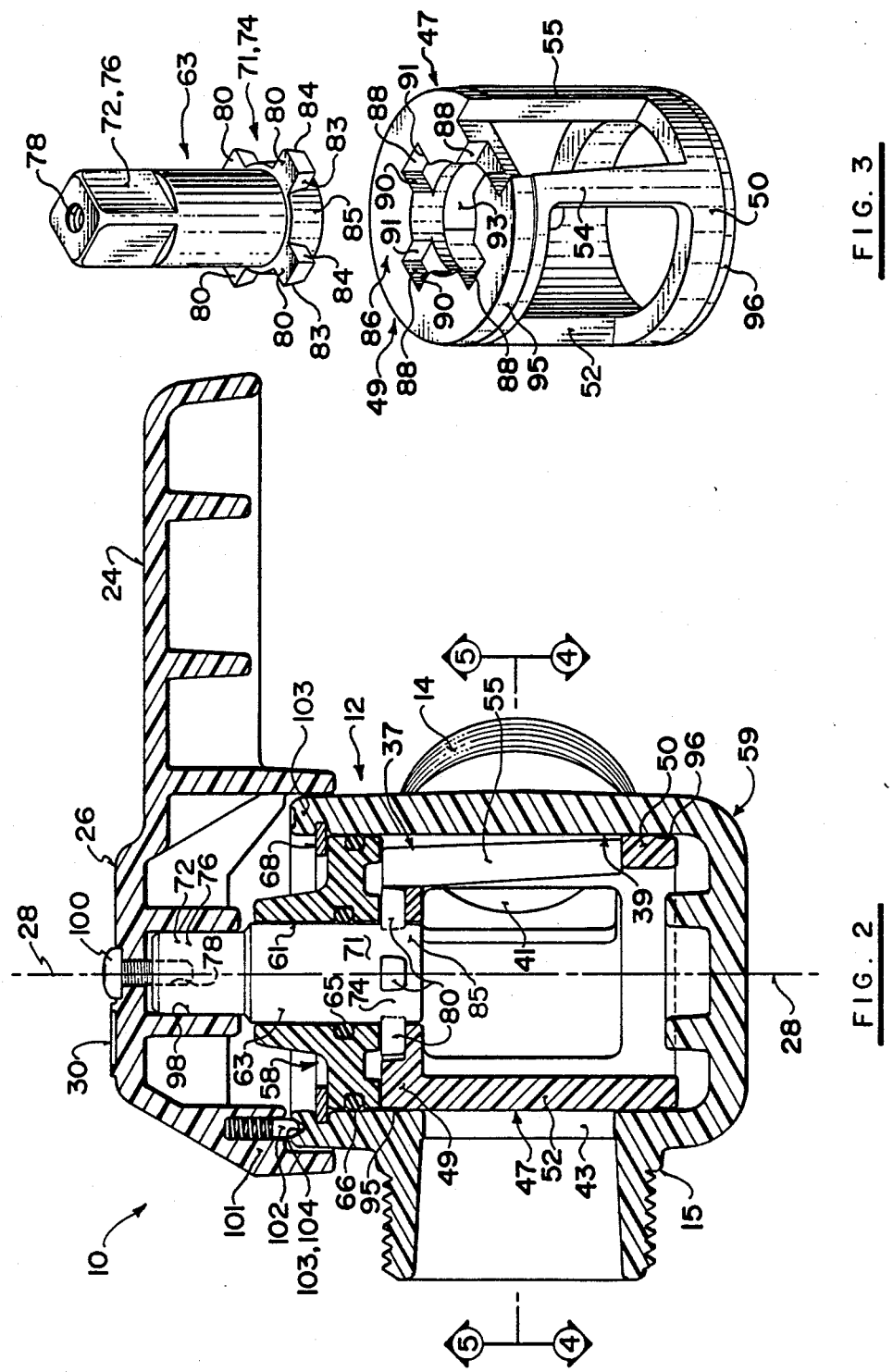

FLUID VALVE APPARATUS

BACKGROUND OF THE INVENTION

The invention relates to a fluid valve apparatus, particularly a three-way, manually-actuated, liquid control valve used for controlling flow in conduits.

Manually actuated valves have been used for many years, and have many sizes and configurations. Simple, 3-way valves associated with small bore pipes, such as domestic garden hose pipes, can be fabricated from injection moulded plastic, but larger valves for controlling flow in larger bore pipes, such as those used in forest fire fighting, are usually manufactured from machined metal casings. Machined metal is usually preferred for effective sealing of ports therein, and for ruggedness to withstand the tough handling that occurs during usage.

Attempts to manufacture the larger valves from injection moulded plastic have generally been unsuccessful due to leakage problems that can occur with poorly fitting valve seating surfaces which can distort easily when injection moulded in relatively large sizes.

SUMMARY OF THE INVENTION

The invention reduces the difficulties and disadvantages of the prior art by providing a fluid valve apparatus which has a novel spool and body structure which can be manufactured using injection molded plastic. Injection molding can essentially eliminate machining of most of the finished product, and results in a low cost, light weight, rugged, corrosion-resistant valve. The present valve has a novel spool seating structure which provides adequate sealing of an outlet port when flow is to be restricted from flowing therethrough.

A fluid valve apparatus according to the invention has a body, a spool and seating means. The body has a spool cavity defined by a cavity sidewall, the sidewall having inlet and outlet ports therein. The spool is mounted for movement within the spool cavity, and has interconnected spool inlet and outlet portions which are registrable with the inlet and outlet ports to pass fluid through the valve. The spool also has a spool closure portion. The seating means are for sealing the spool closure portion against the outlet port when positioned adjacent the outlet port. The seating means is responsive to fluid pressure acting on the spool, and cooperates with the spool to permit the closure portion to be displaced against the outlet port to improve sealing therewith.

A detailed disclosure following, related to drawings, describes a preferred embodiment of the invention which is capable of expression in structure other than that particularly described and illustrated.

DESCRIPTION OF THE DRAWINGS

FIG. 2 is a simplified, fragmented longitudinal section of the invention, as seen from line 2—2 of FIG. 1, FIG. 3 is a simplified isometric view of a spool and valve actuator according to the invention, the spool and actuator being shown separated.

DETAILED DISCLOSURE

FIG. 1

Figure 1:
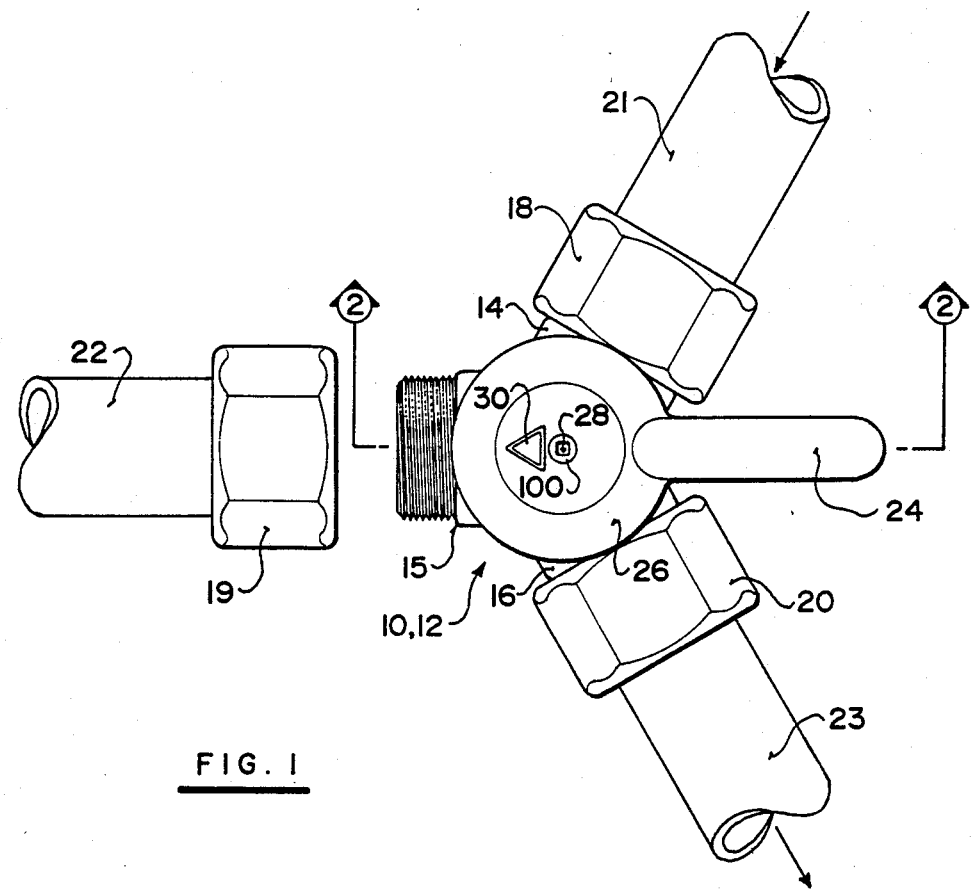
FIG. 1 is a simplified fragmented top plan of a 3-way valve assembly according to the invention, two hoses being shown connected to, and one conduit being shown disconnected from, the valve.

A 3-way valve apparatus 10 according to the invention has a body 12 having first, second and third pipe connectors 14, 15 and 16 extending therefrom spaced equally apart. The pipe connectors 14, 15 and 16 have male threads which are engaged by complementary threaded first, second and third pipe couplings, 18, 19 and 20, respectively, coupled to respective hoses 21, 22 and 23. A manually actuated valve handle 24 for gripping by an operator extends radially from a valve cap 26 which can be rotated by the handle about a valve axis 28. An index 30 indicates restriction of the outlet flow of fluid from the valve. As drawn, when the hose 21 connected to the first pipe connector 14 delivers water under pressure, water leaves the valve through the connector 16 and the hose 23. The index 30 indicates that the connector 15 is closed.

FIGS. 2 and 3

The body 12 has a spool cavity 37 defined by a cavity sidewall 39, which is generally concentric with the axis 28. The sidewall 39 has an inlet port 41 which communicates with the first pipe connector 14, and first and second outlet ports 43 and 44 which communicate with the second and third pipe connectors 15 and 16 respectively, the connector 16 being shown in FIG. 1. Note that the connector 16 and the port 44 are not shown in FIG. 2, but will be described with reference to FIGS. 4 and 5.

The apparatus includes a spool 47 mounted for rotation within the spool cavity generally about the axis 28 as will be described. The spool 47 has axially spaced apart inner and outer ends 49 and 50, a closure portion 52, and first and second connector portions 54 and 55. The ends 49 and 50 have a generally circular outer peripheries when viewed axially to permit relatively smooth rotation within the spool cavity. The connector portions 54 and 55, in combination with the closure portion 52 interconnect the inner and outer ends of the spool as a unit. The portions 52, 54 and 55 are axially extending, peripherally spaced apart members which provide a cage-like spool. Thus, the spool has clearance spaces between the connector portions and the closure portion to pass fluid, which spaces thus serve as spool inlet and outlet portions depending on configuration of the valve.

The body 12 has inner and outer end portions 58 and 59, respectively, the inner end portion having a bore 61 which serves as a journalling means for a spindle 63. For manufacturing and assembly purposes, the inner end portion 58 is separable from the remainder of the body portion, and has O-ring seals 65 and 66 which seal the bore 61 with the spindle 63, and an outer periphery of the inner end portion, with the cavity sidewall 39. A "C-shaped" spring clip 68 is received in a complementary groove in an outer portion of the cavity sidewall 39, and cooperates with the inner end portion 58 to hold the inner end portion 58 within the body.

As best seen in FIG. 3, the spindle 63 has inner and outer ends 71 and 72, the inner end having a cruciform shaped coupling means 74, and the outer end having a square-sectioned portion 76, with an axially aligned threaded opening 78. The coupling means 74 has four tapered cross-sectioned arms 80 extending radially outwardly from the inner end 71 and disposed at 90° to each other when viewed axially. Each arm 80 has a pair of generally radially disposed opposite walls 83 and 84 which taper inwardly downwardly to facilitate engagement with a complementary second coupling means 86 on the spool as will be described. The end 71 has a short cylindrical portion 85.

The inner end portion 49 of the spool 49 has the coupling means 86 which is a generally cruciform shape so as to be complementary to the first coupling means 74. Thus, the second coupling means 86 has four generally radially disposed recesses 88. Each recess 88 has oppositely facing sidewalls 90 and 91 which taper outwardly and upwardly so as to receive the respective arm 80 of the coupling means 74. The short cylindrical portion 85 of the inner end 71 of the spindle is received in a complementary bore 93 of the inner end of the spool 49 to facilitate and maintain engagement of the coupling means 74 and 86. There is clearance between the arms 80 and complementary recesses 88 to permit limited relative movement between the spool and the spindle 63, which is essential for correct operation of the invention. The clearances permit generally radial movement of the spool relative to the spindle for purposes to be described with references to FIGS. 5 and 5A. It can be seen that the first coupling means 74 has generally radially disposed driving faces, that is the walls 83 and 84 of the arms, and the second coupling means 86 has generally radially disposed driven faces, that is the sidewalls 90 and 91 of the recesses which are engaged by the driving faces of the first coupling means. The spindle 63 serves as a valve actuator which is operable to move between first and second positions thereof so as to move the spool between respective first and second positions thereof, for example between the relative positions shown in FIGS. 4 and 4A.

The spool has similar inner and outer rims 95 and 96 adjacent corresponding opposite ends of the spool. Each rim has a diameter slightly less than the diameter of the spool as measured across the portions 53, 54 and 55, so as to provide a relieved rim portion at each end which does not contact portions of the spool cavity sidewall 39. Instead, only the portions 52, 54 and 55 can contact the spool cavity sidewall, and are accurately machined so as to be about 0.005 inches (0.127 mm) smaller than the diameter or bore of the spool cavity 37. The relieved portions at opposite ends of the spool provide clearance for any silt that might be carried in water entering the valve, which could otherwise possibly lodge between the spool and spool cavity thus tending to reduce sealing effectiveness. It is added that the spool if preferably machined after injection and aging, to provide an accurate cylindrical surface complementary to the portions of the cylindrical surface surrounding the outlet ports, so as to enhance sealing therewith as will be described with reference to FIG. 5A.

As also best seen in FIG. 2, the valve cap 26 has a square-sectioned central recess 98 which is complementary to the square-sectioned portion 76 of the spindle so as to provide a driving fit between the handle 24 and the spindle, a retaining screw 100 being used to secure the handle to the spindle.

To facilitate alignment of the spool outlet and inlet ports with the valve body pipe connectors, a spring-loaded plunger 102 is mounted within a complementary bore of a cap rim portion 101 of the valve cap 26. A body rim portion 103 has two or more recesses 104 which are complementary to an end of the plunger 102 so as to receive the plunger therein, when the spool is suitably aligned, so as to either open or close the ports as required. The index 30, which is aligned with the portion 52, simplifies positioning of the handle 24 to locate the desired recess 104 in the rim portion so as to open or close the desired port.

Figures 4, 4A:
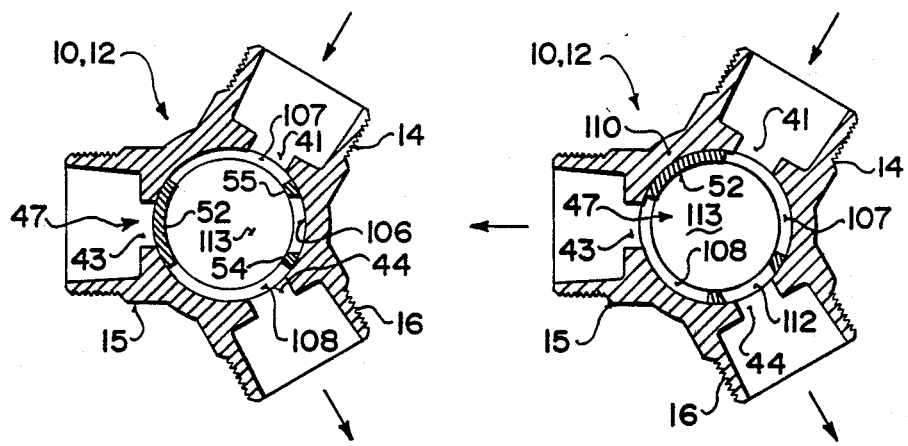
FIG. 4 is a transverse cross-sectional diagram of the 3-way valve as seen from line 4—4 of FIG. 2, the valve being shown with one outlet port closed, and fluid being directed through a remaining outlet port.
FIG. 4A is a view similar to FIG. 4 showing both outlet ports open.

FIGS. 4 and 4A

Referring to FIG. 4, the spool 47 is positioned so that the closure portion 52 seals the first outlet port 43, and the connector portions 54 and 55 are disposed adjacent a sidewall 106 which is between the ports 41 and 44 is diametrically opposite to the first outlet port 43. Thus, the circumferential clearance space between the portions 52 and 55 serve as a spool inlet 107, and the corresponding clearance space between the portions 52 and 54 serves as a spool outlet 108. It can be seen that the spool thus has interconnected spool inlet and outlet portions which are registrable with the inlet and outlet ports to pass fluid through the valve with negligible restriction as the fluid passes through an open central portion 113 of the spool itself. This contrasts with many prior spool valves known to the inventor, which are commonly provided with a central spindle for journalling the spool, which spindle tends to restrict flow through the prior art spool.

In FIG. 4, the fluid passing through the first pipe connector 14 passes through the inlet port 41, the spool inlet 107, across the open central portion 113, through the spool outlet 108 and the second outlet port 44 so as to discharge from the valve through the third pipe connector 16. There is essentially no flow through the second pipe connector 15 as the port 43 is closed by the closure portion 52. Thus the valve in this configuration has one open outlet port and one closed outlet port.

Referring to FIG. 4A, if it is necessary for water to discharge simultaneously through both pipe connectors 15 and 16, the spool can be rotated slightly anti-clockwise as views so that the closure portion 52 is adjacent to a sidewall portion 110 disposed between the ports 41 and 43. It can be seen that the spool inlet 107 is still registered with the inlet port 51, but the spool outlet 108 is now registered with the first outlet port 43. Clearance between the connector portions 54 and 55, which was adjacent to sidewall portion 106, has now become registered with the second outlet port 44 and thus serves as a second spool outlet 112. Thus, the valve now has two open outlet ports. Again, it can be seen that there is negligible restriction to flow through the valve due to the spool itself.

OPERATION

Figure 5A:
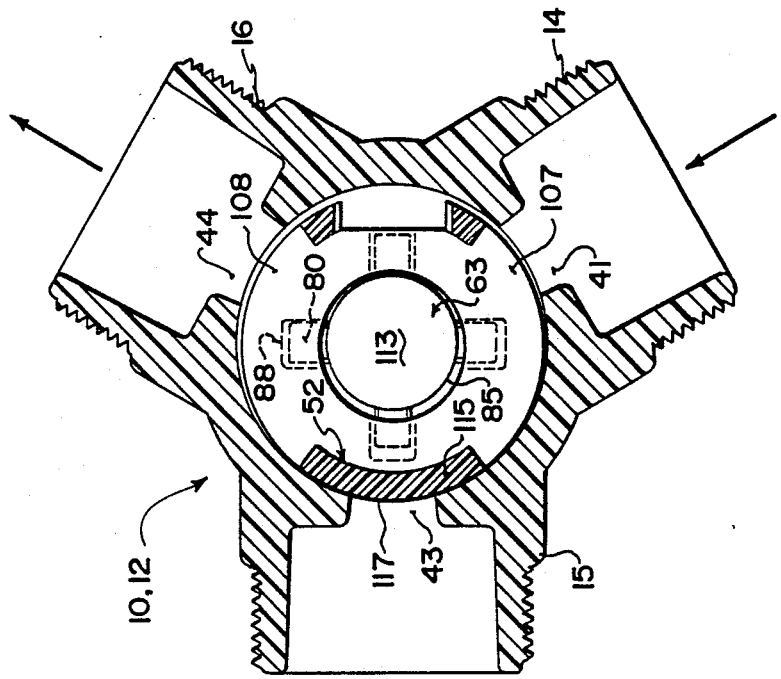
FIG. 5A is a view similar to FIG. 5, showing the spool displaced eccentrically under the influence of fluid pressure applied in the inlet port so as to close an outlet port, clearances being exaggerated for clarity.
Figure 5:
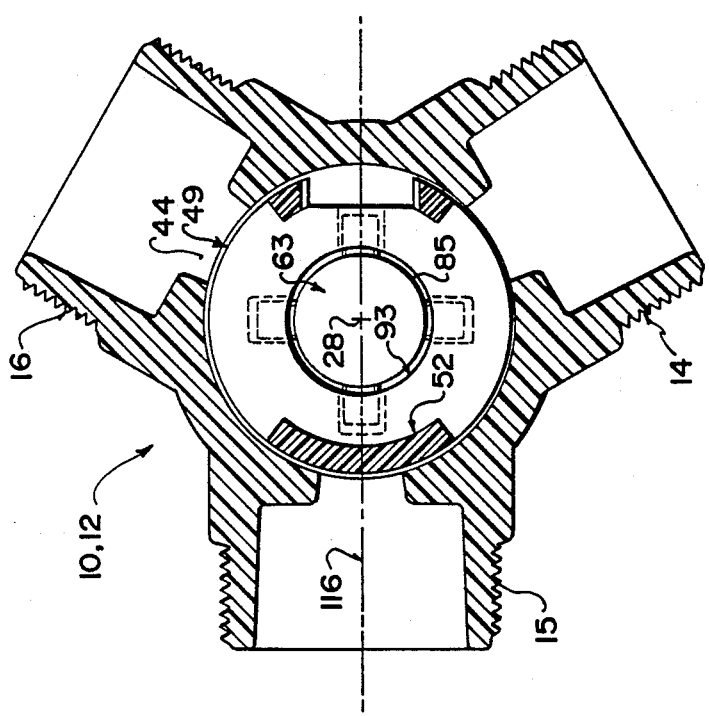
FIG. 5 is a simplified section on line 5—5 of FIG. 2 showing the spool in a position in which one outlet port is closed and one outlet port is open, the spool being shown generally centered without fluid pressure applied, clearances being exaggerated for clarity.

FIGS. 5 and 5A

An important aspect of the invention relates to a fluid pressure actuated sealing means which permits use of injection moulded plastic components for a relatively large size valve, which provides adequate sealing for many applications. The novel sealing feature of the invention functions as follows.

Referring to FIG. 5, the assembly 10 is shown with no fluid supplied to the valve, i.e. the valve is not subject to any fluid forces, and the spool assumes a generally central position within the cavity. Radial clearances between the portions 52, 54, 55, and the inner end 49 of the spool and the sidewall 39 are generally equal and are shown exaggerated for clarity. Similarly, clearances between the bore 93 of the spool and spindle 63, and the arms 80 and recesses 88 are shown exaggerated.

Referring to FIG. 5A, fluid under pressure is supplied to the first pipe connector 14, and passes through the inlet port 41 into the spool 47, before leaving through the second outlet port 44 as previously described with reference to FIG. 4. The spool closure portion 52 has an inner face 115 which defines one wall of the open central portion 113 of the spool, and thus is exposed to fluid pressure within the spool central portion. The radial clearances between the portions of the spool, the spool cavity and the spindle 63 as previously described results in lateral or generally radial movement of the spool due to force from the fluid pressure. In this way, the closure portion 52 is forced against the first outlet port 43, thus initiating and augmenting sealing of the outlet port. A slight lateral movement of the spool has no effect on water entering or leaving the spool, which passes freely between the spool inlet 107 and outlet 108 as described previously. Clearly, the said radial clearances between the inner end of the spindle 63 and the bore 93 of the spool, the arms and recesses and the inner end of the spool 49 and the cavity are necessary to permit this lateral movement. The previously mentioned clearances between the arms 80, and generally complementary recesses 88 of the first and second coupling means facilitates this lateral movement if one pair of arms straddles a diameter 116 passing symmetrically through the closure portion 52.

It can be seen that the first and second coupling means cooperate with each other to provide lost motion there between to permit the spool to move in response to fluid pressure acting on the spool. Note that the movement of the closure means 52 of the spool is generally parallel to some of the driving and driven faces, that is the walls 83, 84 of the arm, and the walls 90, 91 of the recesses of the coupling means. The applicant also attributes the enhancement of sealing to slight deflection of the closure portion 52 against the periphery of the outlet port due to fluid pressure acting on the inner face of the closure portion. Clearly, if wall thickness of the closure portion is sufficiently thin to deflect outwardly slightly under fluid pressure forces, radial movement of the closure portion, plus slight outwards deflection of the closure portion, would enhance sealing against the periphery of the outlet port. Thus, an outer face 117 of the spool closure portion 52 is adapted to be seated against a periphery of the outlet port 43 in response to fluid pressure acting upon the inner face 115 of the closure portion. The clearances previously referred to result in the spool portion being mounted for essential radial movement to seal the closure portion against the outlet port.

From the above description, it can be seen that the clearances between the spool and the spool cavity, and the first and second coupling means of the spool and spool actuator and some slight deflection of the spool closure portion serve as seating means for seating the spool closure portion against the outlet port when positioned adjacent the outlet port. The seating means is responsive to fluid pressure acting on the spool and cooperating with the spool to permit the closure portion to be displaced against the outlet port to improve sealing therewith.

The valve as disclosed is designed to seal an outlet port when fluid pressure supplied at the inlet port acts on the closure portion of the spool to force the spool against the periphery of the outlet port. If the spool were rotated to position the closure portion at the inlet port, the fluid pressure at the inlet port would displace the closure portion away from the periphery of the inlet port, thus preventing complete seating of the spool with the resulting flow past the closure portion. Thus, the present valve does not seal effectively when the closure portion is positioned at the inlet port.

ALTERNATIVES

The valve apparatus discloses the spool mounted for rotation within the spool cavity about the valve axis 28, with the spool closure portion 52 being spaced peripherally between the spool inlet and outlet portions 107 and 112 respectively. With this arrangement, the inlet and outlet ports 41, 43 and 45 of the assembly are spaced peripherally around the cavity sidewall 39 and the spool closure portion is mounted for essentially radial movement in response to fluid pressure, which movement is generally normal to the valve axis. Alternative valve apparatus can be designed, using the general principle of the invention, in which fluid pressure within the spool acts on the spool to displace the spool, and to deflect the spool to some extent to enhance sealing of the spool closure portion against the outlet port. While the apparatus is shown used with a three-way valve, clearly the valve could be designed for two or more ways, while still utilizing the seating means to enhance sealing of the valve.

What is claimed:
1. A fluid valve apparatus having:
   (a) a body having a spool cavity defined by a cavity sidewall, the sidewall having inlet and outlet ports therein spaced peripherally around the cavity sidewall,
   (b) a spool mounted for rotation within the spool cavity, the spool having interconnected spool inlet and outlet portions which are spaced peripherally around the spool and are registrable with the inlet and outlet ports to pass fluid through the valve, the spool having a spool closure portion spaced peripherally between the spool inlet and outlet portions, relative angular spacing between the inlet and outlet ports of the body being similar to relative angular spacing between the closure portion and the inlet portion of the spool so that the outlet port can be closed by the closure portion when the inlet port is aligned with the inlet portion,
   (c) the spool also being mounted for limited essentially radial movement for seating the spool closure portion against the outlet port when positioned adjacent the outlet port, fluid pressure acting on the spool forcing the closure portion against the outlet port for sealing therewith.
2. An apparatus as claimed in claim 1 in which:
   (a) the spool closure portion has inner and outer faces, the outer face being adapted to be seated against the outlet port in response to fluid pressure acting upon the inner face.

3. An apparatus as claimed in claim 1 in which:
(a) a valve actuator is operable to move between first and second positions thereof to move the spool between first and second positions thereof, the valve actuator having a first coupling means,
(b) the spool has a second coupling means cooperating with the first coupling means of the valve actuator to be responsive to position of the valve actuator,
(c) the first and second coupling means cooperate with each other to provide lost motion therebetween to permit the spool to move in response to fluid pressure.

4. An apparatus as claimed in claim 1 in which:
(a) the body has one inlet port and two outlet ports spaced peripherally around the cavity sidewall.

5. An apparatus as claimed in claim 4, in which:
(a) the three ports are spaced equally peripherally around the body,
(b) the spool has an outer end spaced axially from the inner end thereof, and two connector portions which, in combination with the closure portion interconnect the inner end and outer ends of the spool as a unit, the two connector portions being disposed between the spool inlet portion and the spool outlet portion and being spaced peripherally apart to provide a clearance for transfer of fluid between the spool cavity and a port of the body.

6. An apparatus as claim in claim 5, in which:
(a) the closure portion and the two connector portions have outer surfaces which are portions of a cylinder having a diameter slightly less than diameter of the spool cavity.

7. An apparatus as claimed in claim 6, in which:
(a) the spool has similar inner and outer rims adjacent corresponding opposite ends of the spool, each rim having a diameter slightly less than diameter of the spool, to provide clearance to facilitate seating of the closure portion against the outlet port of the body.

8. An apparatus as claimed in claim 3 in which:
(a) the first coupling means has generally radially disposed driving faces,
(b) the second coupling means has generally radially disposed driven faces which are engaged by the driving faces of the first coupling means,
(c) the closure means is disposed for movement generally parallel to some of the driving and driven faces.

9. An apparatus as claim in claim 3 in which:
(a) the first and second coupling means has driving and driven members of generally cruciform and complementary shape.

10. An apparatus as claim in claim 3 in which:
(a) the spool has an inner end having the second coupling means,
(b) the spool has a diameter slightly less than diameter of the spool cavity to provide a journalling means to journal the spool for rotation within the spool cavity, and to permit the said generally radial movement of the spool for sealing.

11. An apparatus as claim in claim 10 in which:
(a) the spool has an outer end spaced axially from the inner end thereof, and at least one connector portion which, in combination with the closure portion, interconnects the inner and outer ends of the spool as a unit, the connector portion being disposed between the spool inlet portion and the spool outlet portion,
(b) the spool has a similar inner and outer rims adjacent corresponding opposite ends of the spool, each rim having a diameter slightly less than diameter of the spool, to provide clearance to facilitate seating of the closure portion against the outlet port of the body.

12. An apparatus as claimed in claim 1 further comprising:
(a) the body having inner and outer end portions having journalling means for journalling the spool therein,
(b) a valve actuator which is operable to move between first and second positions thereof, so as to move the spool between first and second positions thereof, the valve actuator having a first coupling means, the actuator being journalled in the journalling means of the inner end portion.

13. An apparatus as claimed in claim 12 in which:
the valve actuator is a spindle having inner and outer ends, the inner end having the first coupling means, the outer end receiving a handle for gripping by an operator,
(b) the spool having inner and outer ends, the inner end having a second coupling means which cooperates with the first coupling means so as to reflect movement of the handle and valve actuator, the outer end of the spool having journalling means to journal the spool with respect to the spool cavity.

14. An apparatus as claim in claim 2 in which:
(a) the spool has an open central portion interconnecting the spool inlet and outlet portions to provide a fluid conduit therebetween with negligible fluid restriction,
(b) the inner face of the spool closure portion defines one wall of the spool open central portion so as to be exposed to fluid pressure within the spool open central portion.

15. An apparatus as claimed in claim 1, in which:
(a) the spool and valve body portions surrounding the inlet and outlet ports are made from a material which is essentially rigid, having neglible resilience under normal operating forces.

16. A fluid valve apparatus having:
(a) a body having a spool cavity defined by a cavity sidewall, the sidewall having inlet and outlet ports therein spaced peripherally around the cavity sidewall,
(b) a spool mounted for rotation within the spool cavity about an axis, and also mounted for limited generally radial movement which is generally normal to the axis, the spool having interconnected spool inlet and outlet portions which are spaced peripherally around the spool and are registrable with the inlet and outlet ports to pass fluid through the valve, the spool having a spool closure portion spaced peripherally between the spool inlet and outlet portions,
(c) seating means for seating the spool closure portion against the outlet port when positioned adjacent the outlet port, the seating means being responsive to fluid pressure acting on the spool and cooperating with the spool to permit the closure portion to be displaced against the outlet port to improve sealing therewith, (d) a valve actuator operable to move between first and second positions thereof to move the spool between first and second positions thereof, the valve actuator having a first coupling means, (e) the spool has an inner end having a second coupling means cooperating with the first coupling means of the valve actuator to be responsive to position of the valve actuator, the first and second coupling means cooperating with each other to provide lost motion therebetween to permit the spool to move in response to fluid pressure, (f) the spool also having a diameter slightly less than diameter of the spool cavity to provide a journalling means to journal the spool for rotation within the spool cavity, and to permit the said generally radial movement of the spool for sealing, (g) the spool also having an outer end spaced axially from the inner end thereof, and at least one connector portion which, in combination with the closure portion, interconnects the inner and outer ends of the spool as a unit, the connector portion being disposed between the spool inlet portion and the spool outlet portion, (h) the spool also having similar inner and outer rims adjacent corresponding opposite ends of the spool, each rim having a diameter slightly less than diameter of the spool, to provide clearance to facilitate seating of the closure portion against the outlet port of the body.

17. An apparatus as claimed in claim 16 in which:
(a) the spool closure portion has inner and outer faces, the outer face being adapted to be seated against the outlet port in response to fluid pressure acting upon the inner face.

18. An apparatus as claimed in claim 17, in which:
(a) the spool has an open central portion interconnecting the spool inlet and outlet portions to provide a fluid conduit therebetween with neglible fluid restrictions,
(b) the inner face of the spool closure portion defines one wall of the spool open central portion so as to be exposed to fluid pressure within the spool open central portion.

19. An apparatus as claimed in claim 16, in which:
(a) the first coupling means has generally radially disposed driven faces which are engaged by the driving faces of the first coupling means,
(b) the closure means is disposed for movement generally parallel to some of the driving and driven faces.

20. An apparatus as claim in claim 16, in which:
(a) the first and second coupling means has driving and driven members of generally cruciform and complementary shape.

* * * * *